United States Patent
Hagimori

(10) Patent No.: US 6,462,886 B1
(45) Date of Patent: Oct. 8, 2002

(54) TAKING LENS DEVICE

(75) Inventor: Hitoshi Hagimori, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/826,767

(22) Filed: Apr. 5, 2001

(30) Foreign Application Priority Data

Apr. 7, 2000 (JP) ........................................ 2000-111913
Dec. 4, 2000 (JP) ........................................ 2000-368338

(51) Int. Cl.[7] ............................................... G02B 15/14
(52) U.S. Cl. ........................................ 359/687; 359/686
(58) Field of Search ................................. 359/687, 686, 359/684, 683

(56) References Cited

U.S. PATENT DOCUMENTS 6,331,917 B1 * 12/2001 Ishii et al. .................. 359/687

FOREIGN PATENT DOCUMENTS

| JP | 04-296809 A | 10/1992 |
| JP | 06-317751 A | 11/1994 |
| JP | 07-311340 A | 11/1995 |

* cited by examiner

*Primary Examiner*—Hung Xuan Dang
(74) *Attorney, Agent, or Firm*—Sidley Austin Brown & Wood LLP

(57) ABSTRACT

A taking lens device has zoom lens system that comprises plurality of lens units that achieves zooming by varying unit-to-unit distances and image sensor that converts optical image formed by the system into an electrical signal. The lens system comprises, from object side: first lens unit having positive optical power, second lens unit having negative optical power, third lens unit having positive optical power, and fourth lens unit having positive optical power. During zooming from wide-angle to telephoto, fourth lens unit is moved toward the object side in zoom range from wide-angle to middle-focal-length position and toward the image side in zoom range from the middle-focal-length position to telephoto. Moreover, following conditional formula is satisfied: $9<f1/fW<30$, where f1 represents a focal length of the first lens unit, and fW represents a focal length of entire lens system at wide-angle.

15 Claims, 8 Drawing Sheets

FNO=2.17
W
— d
—·— g
----- SC
-0.5  0.5
SPHERICAL ABERRATION
SINE CONDITION

Y'=5.5
---- DM
—— DS
-0.5  0.5
ASTIGMATISM

Y'=5.5
-10.0  10.0
DISTORTION %

FNO=3.11
M
— d
—·— g
----- SC
-0.5  0.5
SPHERICAL ABERRATION
SINE CONDITION

Y'=5.5
---- DM
—— DS
-0.5  0.5
ASTIGMATISM

Y'=5.5
-10.0  10.0
DISTORTION %

FNO=3.60
T
— d
—·— g
----- SC
-0.5  0.5
SPHERICAL ABERRATION
SINE CONDITION

Y'=5.5
---- DM
—— DS
-0.5  0.5
ASTIGMATISM

Y'=5.5
-10.0  10.0
DISTORTION %

FNO=2.26

W
— d
—·— g
----- SC

-0.2   0.2
SPHERICAL ABERRATION
SINE CONDITION

Y'=5.5

----- DM
——— DS

-0.2   0.2
ASTIGMATISM

Y'=5.5

-2.0   2.0
DISTORTION %

FNO=3.17

M
— d
—·— g
----- SC

-0.2   0.2
SPHERICAL ABERRATION
SINE CONDITION

Y'=5.5

----- DM
——— DS

-0.2   0.2
ASTIGMATISM

Y'=5.5

-2.0   2.0
DISTORTION %

FNO=3.60

T
— d
—·— g
----- SC

-0.2   0.2
SPHERICAL ABERRATION
SINE CONDITION

Y'=5.5

----- DM
——— DS

-0.2   0.2
ASTIGMATISM

Y'=5.5

-2.0   2.0
DISTORTION %

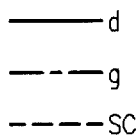
FIG. 6A
FNO=2.26
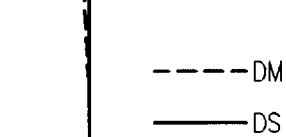
FIG. 6B
Y'=5.5
FIG. 6C
Y'=5.5
-0.5    0.5
SPHERICAL ABERRATION
SINE CONDITION
-0.5    0.5
ASTIGMATISM
-10.0    10.0
DISTORTION %
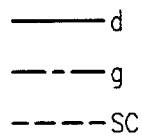
FIG. 6D
FNO=3.23
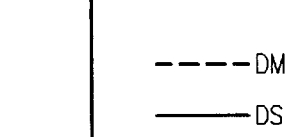
FIG. 6E
Y'=5.5
FIG. 6F
Y'=5.5
-0.5    0.5
SPHERICAL ABERRATION
SINE CONDITION
-0.5    0.5
ASTIGMATISM
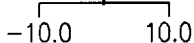
-10.0    10.0
DISTORTION %
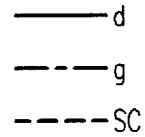
FIG. 6G
FNO=3.60
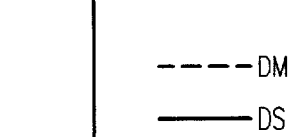
FIG. 6H
Y'=5.5
FIG. 6I
Y'=5.5
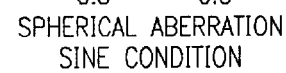
-0.5    0.5
SPHERICAL ABERRATION
SINE CONDITION
-0.5    0.5
ASTIGMATISM
-10.0    10.0
DISTORTION %

FNO=2.26

W

— d
—·— g
----- SC

-0.2   0.2
SPHERICAL ABERRATION
SINE CONDITION

Y'=5.5

----- DM
——— DS

-0.2   0.2
ASTIGMATISM

Y'=5.5

-2.0   2.0
DISTORTION %

FNO=3.79

T

— d
—·— g
----- SC

-0.2   0.2
SPHERICAL ABERRATION
SINE CONDITION

Y'=5.5

----- DM
——— DS

-0.2   0.2
ASTIGMATISM

Y'=5.5

-2.0   2.0
DISTORTION %

FIG. 8A
FNO=2.27
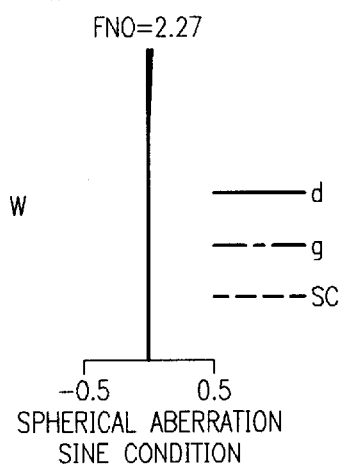
W
—— d
—·— g
----- SC
SPHERICAL ABERRATION
SINE CONDITION
FIG. 8B
Y'=5.5
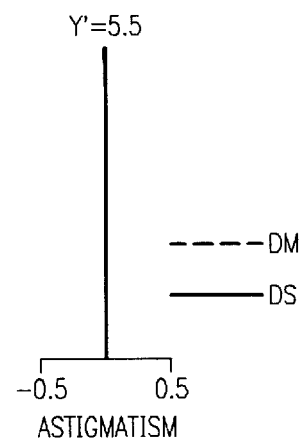
----- DM
—— DS
ASTIGMATISM
FIG. 8C
Y'=5.5
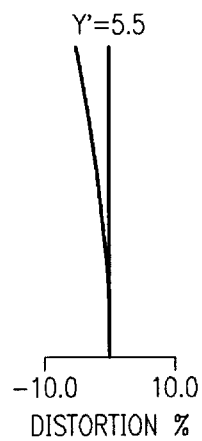
DISTORTION %
FIG. 8D
FNO=4.23
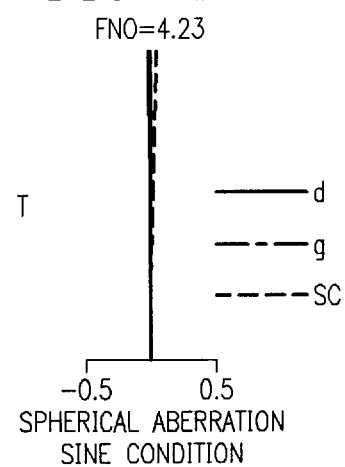
T
—— d
—·— g
----- SC
SPHERICAL ABERRATION
SINE CONDITION
FIG. 8E
Y'=5.5
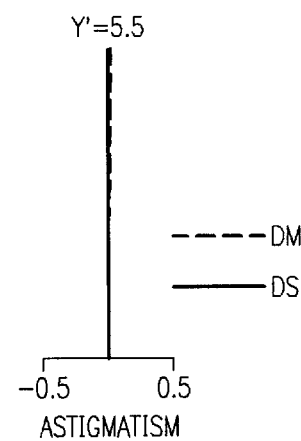
----- DM
—— DS
ASTIGMATISM
FIG. 8F
Y'=5.5
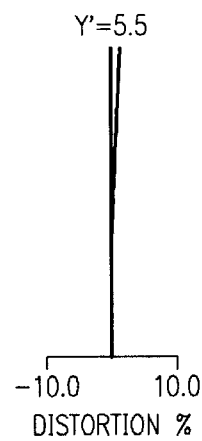
DISTORTION %
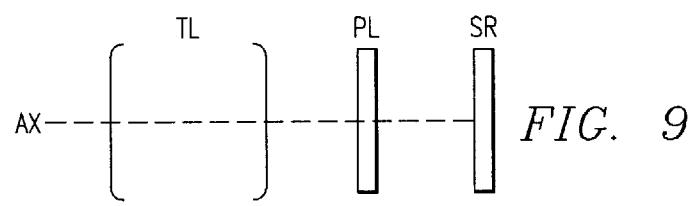
FIG. 9
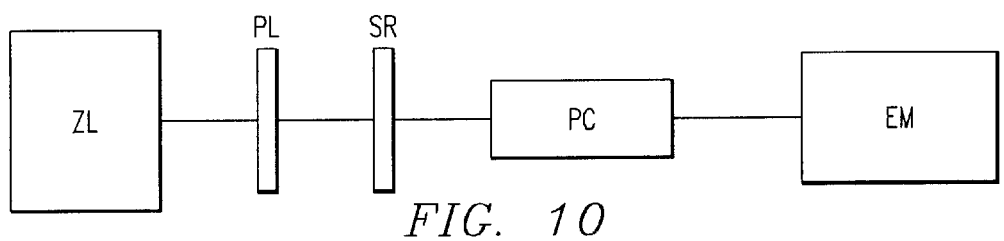
FIG. 10

TAKING LENS DEVICE

This application is based on Japanese Patent Applications Nos. 2000-111913 and 2000-368338, filed on Apr. 7, 2000 and Dec. 4, 2000, respectively, the contents of which are hereby incorporated by reference.

BACKGROUND OF THE INVENTION

1. Field of the Invention

The present invention relates to an optical or taking lens device. More specifically, the present invention relates to an optical or taking lens device that optically takes in an image of a subject through an optical system and then outputs the image as an electrical signal by means of an image sensor. For example, an optical or taking lens device is used as a main component of a digital still camera, a digital video camera, or a camera that is incorporated in, or externally fitted, to a device such as a digital video unit, a personal computer, a mobile computer, a portable telephone, or a personal digital assistant (PDA). The present invention relates particularly to an optical or taking lens device provided with a high-zoom-ratio, high-performance zoom lens system.

2. Description of Prior Art

Conventionally, the majority of high-zoom-ratio zoom lenses for digital cameras are of the type comprising, from the object side, a first lens unit having a positive optical power, a second lens unit having a negative optical power, a third lens unit having a positive optical power, and a fourth lens unit having a positive optical power (for example, Japanese Patent Application Laid-Open No. H4-296809). This is because a positive-negative-positive-positive configuration excels in compactness.

On the other hand, as zoom lenses aiming for higher zoom ratios are known zoom lenses of the type comprising, from the object side, a first lens unit having a positive optical power, a second lens unit having a negative optical power, a third lens unit having a positive optical power, a fourth lens unit having a positive optical power, and a fifth lens unit having a positive optical power (for example, Japanese Patent Application Laid-Open No. H6-317751). This positive-negative-positive-positive-positive configuration is also known as a configuration used in interchangeable lenses for single-lens reflex cameras (for example, Japanese Patent Application Laid-Open No. H7-311340).

However, the zoom lens proposed in Japanese Patent Application Laid-Open No. H6-317751 mentioned above keeps its first lens unit stationary during zooming, and is therefore unfit for further improvement for higher performance necessitated by the trend toward higher zoom ratios and smaller image-sensor pixel pitches. On the other hand, the zoom lens proposed in Japanese Patent Application Laid-Open No. H7-311340, mentioned above, is designed for single-lens reflex cameras, and is therefore unfit for digital or video cameras. In particular, the directions in which this zoom lens moves its second to fourth lens units are also unfit for such applications and it is impossible to achieve a high zoom ratio or obtain satisfactory aberration characteristics. The positive-negative-positive-positive configuration mentioned first has been used in the majority of conventional high-zoom-ratio zoom lenses, but is still susceptible to optimization in terms of how to move individual lens units and how to distribute different optical powers.

SUMMARY OF THE INVENTION

An object of the present invention is to provide an optical or taking lens device with a compact, high-zoom-ratio, high-performance zoom lens system that, despite comprising as few as four lens units, i.e., a positive lens unit, a negative lens unit, a positive lens unit, and a positive lens unit, still offers a zoom ratio of about 7× to 10× and an f-number of about 2.5 to 4. The present invention further offers such high performance that it can be used as an optical system for use with a leading-edge image sensor with a very small pixel pitch.

To achieve the above object, according to one aspect of the present invention, an optical or taking lens device is provided with: a zoom lens system which comprises a plurality of lens units and which achieves zooming by varying the unit-to-unit distances; and an image sensor that converts an optical image formed by the zoom lens system into an electrical signal. The zoom lens system comprises, at least from the object side thereof to an image side thereof, a first lens unit having a positive optical power, a second lens unit having a negative optical power, a third lens unit having a positive optical power, and a fourth lens unit having a positive optical power. During zooming from the wide-angle end to the telephoto end, the fourth lens unit is moved toward the object side in the zoom range from the wide-angle end to the middle-focal-length position and toward the image-plane side in the zoom range from the middle-focal-length position to the telephoto end. Moreover, the following conditional formula is fulfilled:

$$9 < f1/fW < 30$$

where $f1$ represents the focal length of the first lens unit; and $fW$ represents the focal length of the entire optical system at the wide-angle end.

BRIEF DESCRIPTION OF THE DRAWINGS

This and other objects and features of the present invention will become clear from the following description, taken in conjunction with the preferred embodiments with reference to the accompanying drawings in which:

FIGS. 6A to 6I are aberration diagrams of Example 3, as observed when focused at infinity;

FIGS. 8A to 8F are aberration diagrams of Example 3, as observed when focused at a close-up distance (D=0.5 m);

FIG. 9 is a diagram schematically illustrating the outline of the optical construction of a taking lens device embodying the invention; and FIG. 10 is a diagram schematically illustrating the outline of a construction of an embodiment of the invention that could be used in a digital camera.

DESCRIPTION OF THE PREFERRED EMBODIMENTS

Hereinafter, the optical or taking lens device embodying the present invention will be described with reference to the drawings and the optical or taking lens device will be referred to as a taking lens device. A taking lens device optically takes in an image of a subject and then outputs the image as an electrical signal. A taking lens device is used as a main component of a camera that is used to shoot a still or moving picture of a subject. For example a digital still camera, a digital video camera, or a camera that is incorporated in, or externally fitted to, a device such as a digital video unit, a personal computer, a mobile computer, a portable telephone, or a personal digital assistant (PDA). A digital camera also includes a memory to store the image from the image sensor. The memory may be removable, for example, a disk, or the memory may be permanently fixed in the camera. FIG. 9 shows a taking lens device comprising, from the object (subject) side, a taking lens system TL that forms an optical image of an object, a plane-parallel plate PL that functions as an optical low-pass filter or the like, and an image sensor SR that converts the optical image formed by the taking lens system TL into an electrical signal. FIG. 10 shows a zoom lens system ZL, an optical low-pass filter PL, an image sensor SR, processing circuits PC that would include any electronics needed to process the image, and a memory EM that could be used in a digital camera.

In all the embodiments described hereinafter, the taking lens system TL is built as a zoom lens system comprised of a plurality of lens units wherein zooming is achieved by moving two or more lens units along the optical axis AX in such a way that their unit-to-unit distances vary. The image sensor SR is realized, for example, with a solid-state image sensor such as a CCD (charge-coupled device) or CMOS (complementary metal-oxide semiconductor) sensor having a plurality of pixels, and, by this image sensor SR, the optical image formed by the zoom lens system is converted into an electrical signal. The optical image to be formed by the zoom lens system has its spatial frequency characteristics adjusted by being passed through the low-pass filter PL that has predetermined cut-off frequency characteristics which are determined by the pixel pitch of the image sensor SR. This helps minimize the so-called aliasing noise that appears when the optical image is converted into an electrical signal. The signal produced by the image sensor SR is subjected, as required, to predetermined digital image processing, image compression, and other processing, and is then, as a digital image signal, recorded in a memory (such as a semiconductor memory or an optical disk) or, if required, transmitted to another device by way of a cable or after being converted into an infrared signal.

Figure 1:
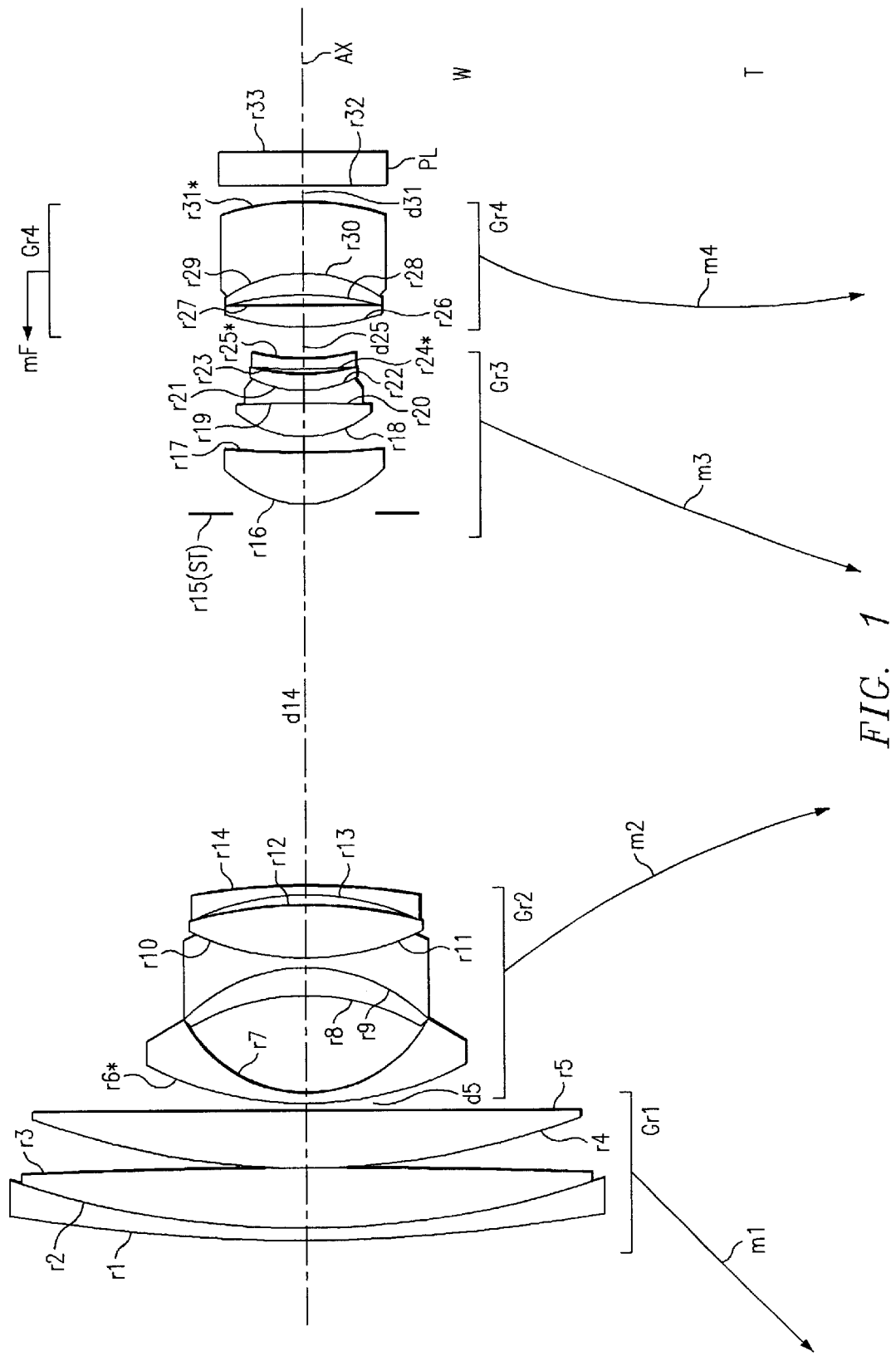
FIG. 1 is a lens arrangement diagram of a first embodiment (Example 1) of the invention.
Figure 2:
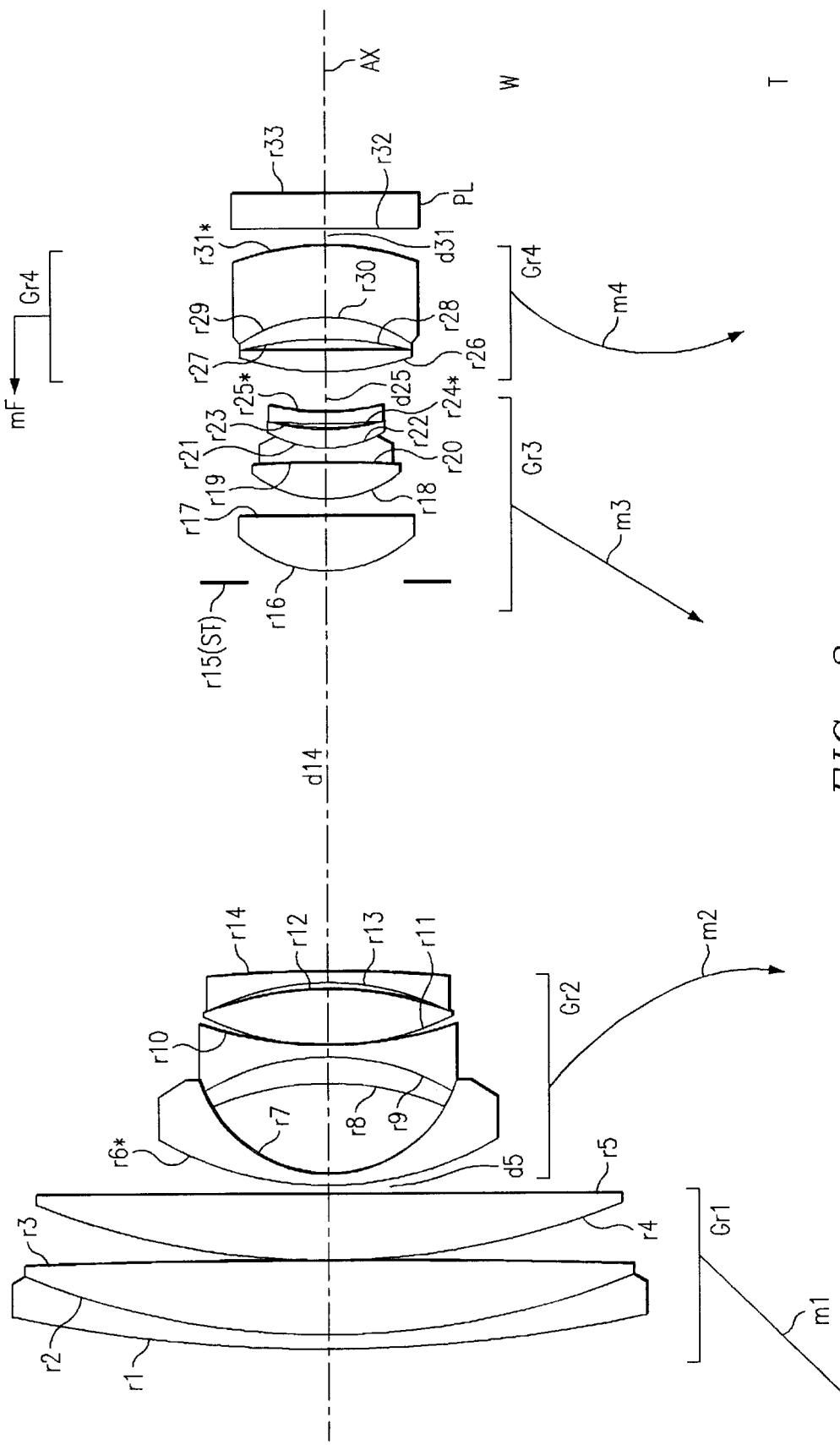
FIG. 2 is a lens arrangement diagram of a second embodiment (Example 2) of the invention.
Figure 3:
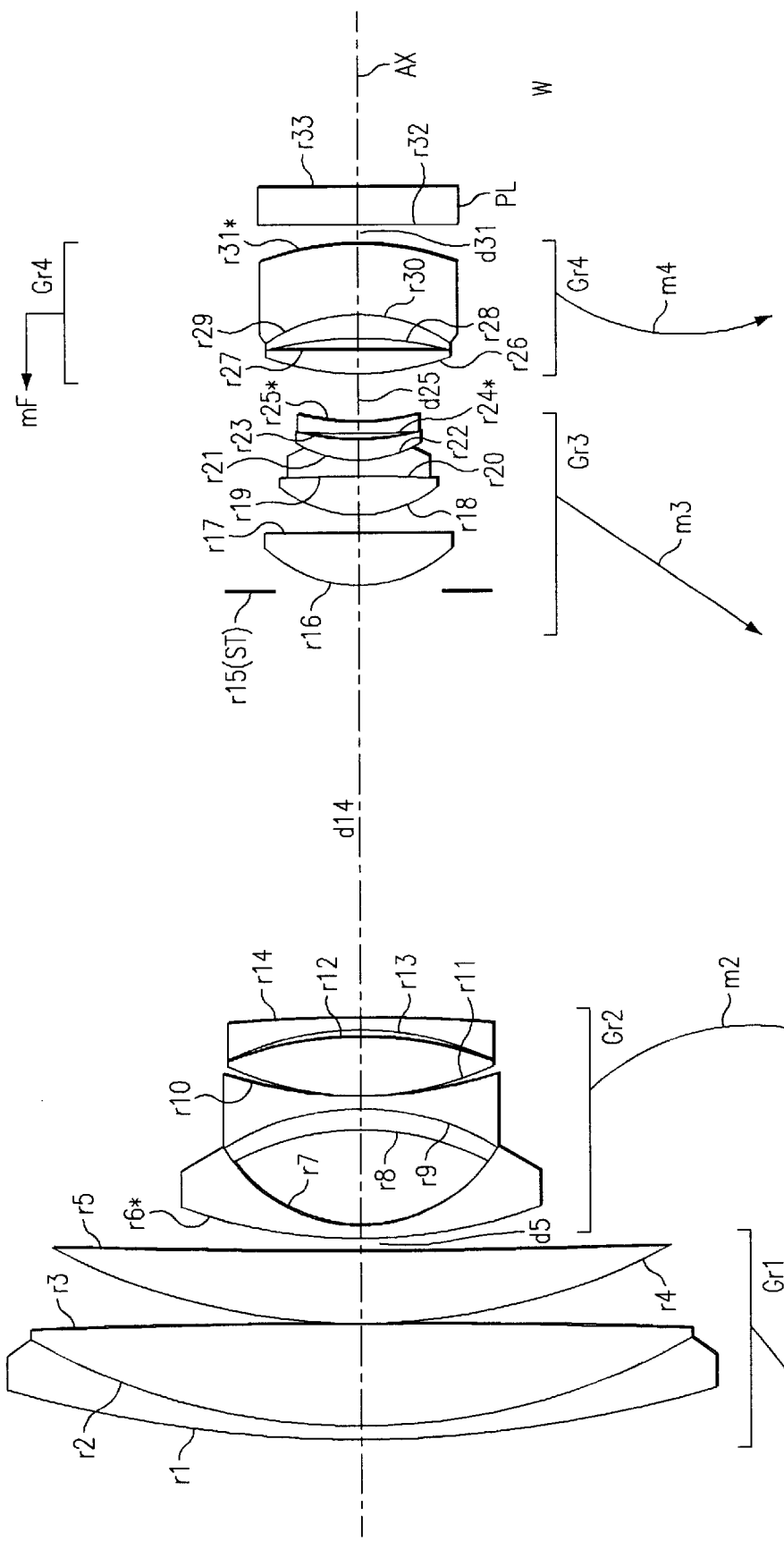
FIG. 3 is a lens arrangement diagram of a third embodiment (Example 3) of the invention.
Figure 4A:
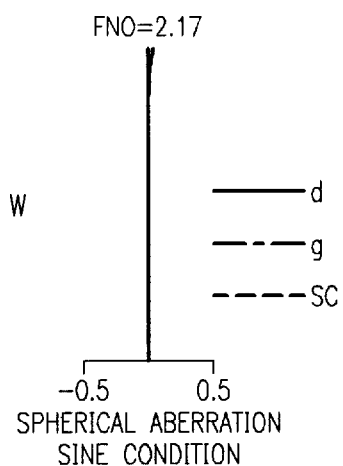
FIGS. 4A to 4I are aberration diagrams of Example 1, as observed when focused at infinity.
Figure 4B:
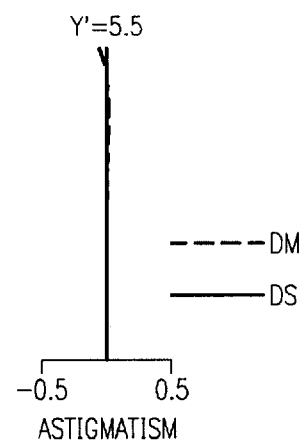
Figure 4C:
Figure 4D:
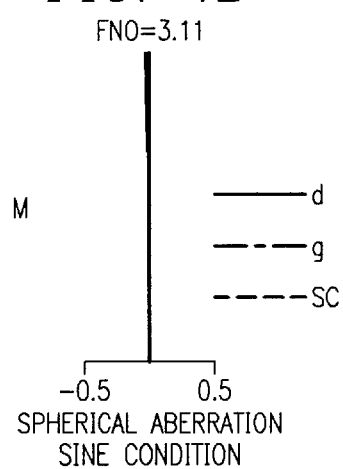
Figure 4E:
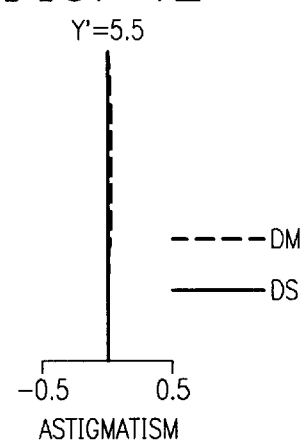
Figure 4F:
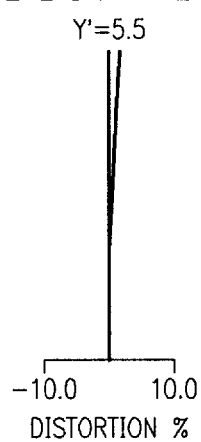
Figure 4G:
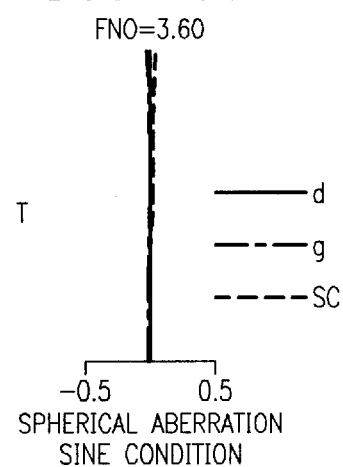
Figure 4H:
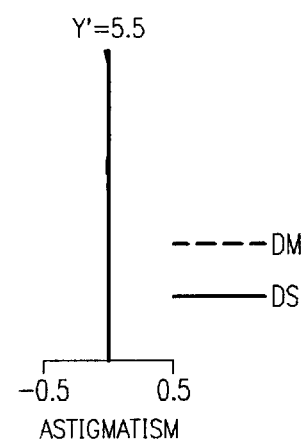
Figure 4I:
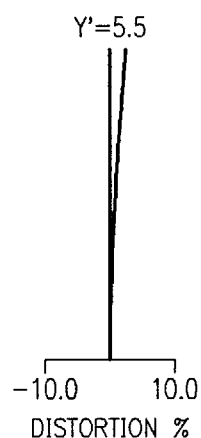
Figure 5A:
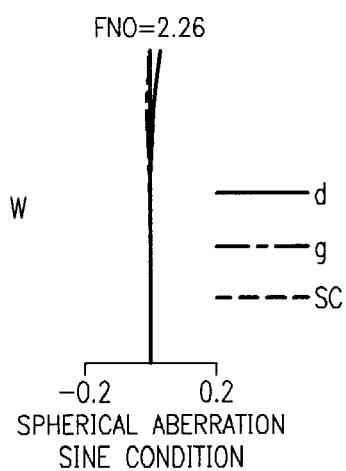
FIGS. 5A to 5I are aberration diagrams of Example 2, as observed when focused at infinity.
Figure 5B:
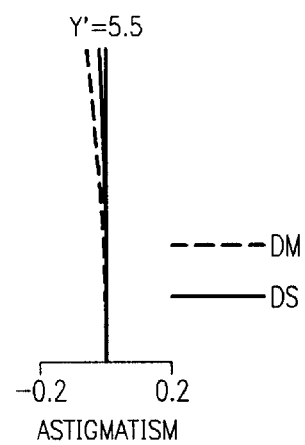
Figure 5C:
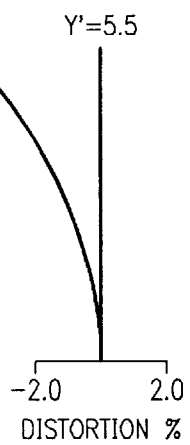
Figure 5D:
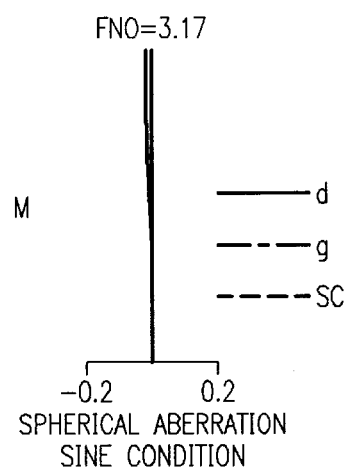
Figure 5E:
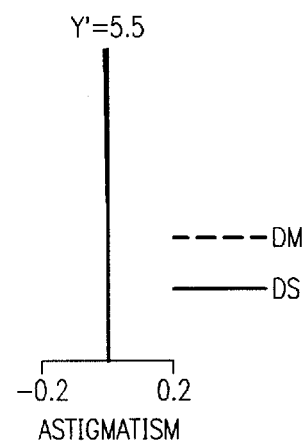
Figure 5F:
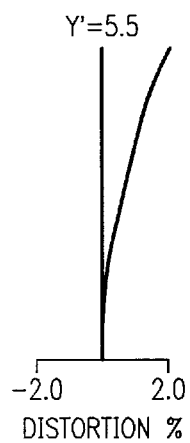
Figure 5G:
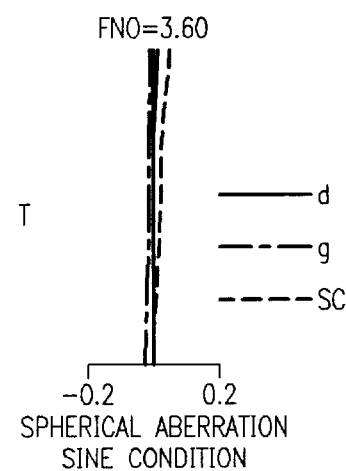
Figure 5H:
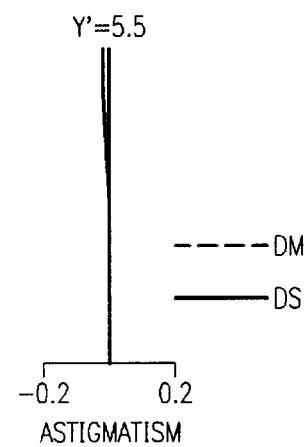
Figure 5I:
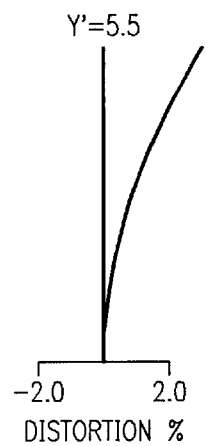
Figure 7A:
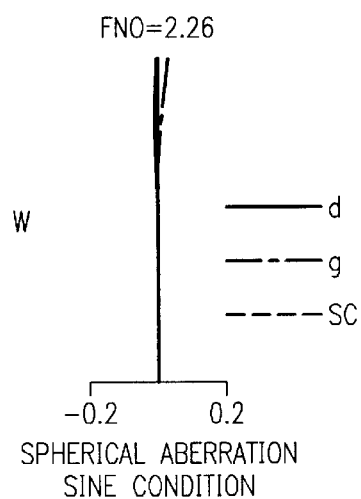
FIGS. 7A to 7F are aberration diagrams of Example 2, as observed when focused at a close-up distance (D=0.5 m)
Figure 7B:
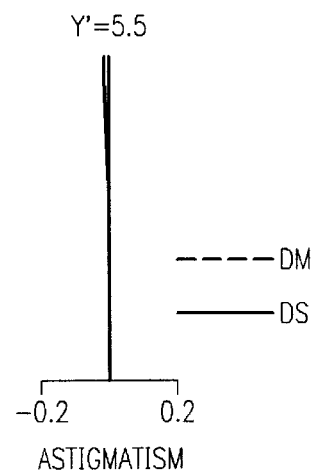
Figure 7C:
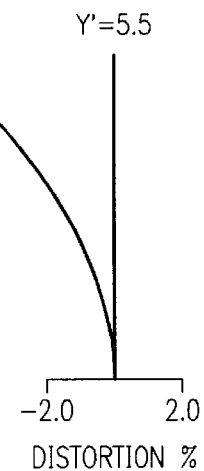
Figure 7D:
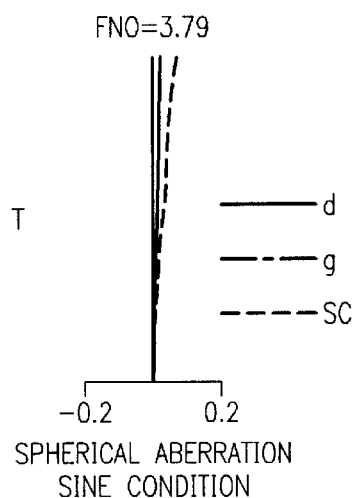
Figure 7E:
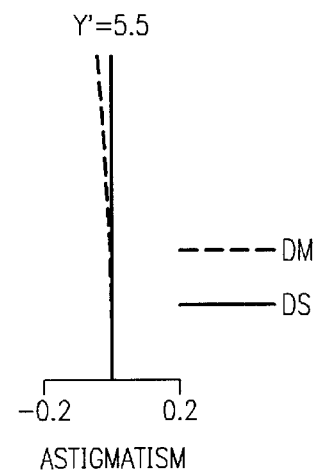
Figure 7F:
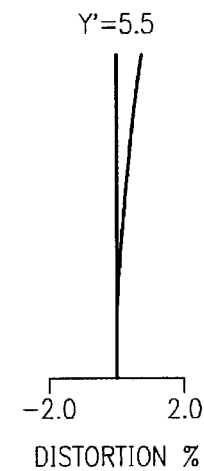

FIGS. 1 to 3 are lens arrangement diagrams of the zoom lens system used in a first to a third embodiment of the present invention, each showing the lens arrangement at the wide-angle end W in an optical sectional view. In each lens arrangement diagram, an arrow mj (j=1, 2, . . . ) schematically indicates the movement of the j-th lens unit Grj (j=1, 2, . . . ) during zooming from the wide-angle end W to the telephoto end T, and an arrow mF indicates the direction in which the focusing unit is moved during focusing from infinity to a close-up distance. Moreover, in each lens arrangement diagram, ri (i=1, 2, 3, . . . ) indicates the i-th surface from the object (subject) side, and a surface ri marked with an asterisk (*) is an aspherical surface. Di (i=1, 2, 3, . . . ) indicates the i-th axial distance from the object side, though only those which vary with zooming, called variable distances, are shown here.

In all the embodiments, the zoom lens system comprises four lens units, i.e., from the object side, a first lens unit Gr1 having a positive optical power, a second lens unit Gr2 having a negative optical power, a third lens unit Gr3 having a positive optical power, and a fourth lens unit Gr4 having a positive optical power. In addition, designed for a camera (for example, a digital camera) provided with a solid-state image sensor (for example, a CCD), the zoom lens system also has a flat glass plate PL, which is a glass plane-parallel plate that functions as an optical low-pass filter or the like, disposed on the image-plane side thereof In all the embodiments, the flat glass plate PL is kept stationary during zooming, and the third lens unit Gr3 includes an aperture stop ST at the object-side end thereof.

In all the embodiments, the zoom lens system achieves zooming from the wide-angle end W to the telephoto end T by moving the first lens unit Gr1 and third lens unit Gr3 toward the object side, moving the second lens unit Gr2 toward the image-plane side, and moving the fourth lens unit Gr4 toward the object side in the zoom range from the wide-angle end W to the middle-focal-length position and toward the image-plane side in the zoom range from the middle-focal-length position to the telephoto end T. By moving the fourth lens unit Gr4 in this way during zooming, i.e. in such a way that it first moves toward the object side and then makes a U-turn to go on to move toward the image-plane side, it is possible to properly correct the curvature of field that occurs in the middle-focal-length region.

In a zoom lens system of a positive-negative-positive-positive configuration, like those of the embodiments, in which the fourth lens unit Gr4 is so moved as to make a U-turn on the way during zooming, it is preferable that conditional formula (1) below be fulfilled. This makes it possible to realize a high-zoom-ratio zoom lens system that excels in compactness. In addition, the thus realized zoom lens system offers a zoom ratio of about 7× to 10×, an f-number of about 2.5 to 4, and high performance that makes the zoom lens system usable as an optical system for use with a leading-edge image sensor SR with a very small pixel pitch.

$$9 < f1/fW < 30 \tag{1}$$

where
- f1 represents the focal length of the first lens unit Gr1; and
- fW represents the focal length of the entirety of the optical system of the zoom lens system at the wide-angle end W.

If the lower limit of conditional formula (1) were to be transgressed, the optical power of the first lens unit Gr1 would be too strong, and thus it would be difficult to eliminate spherical aberration, in particular, at the wide-angle end W. By contrast, if the upper limit of conditional formula (1) were to be transgressed, the optical power of the first lens unit Gr1 would be too weak, and thus it would be difficult to achieve satisfactory compactness, in particular, at the wide-angle end W.

It is preferable that, to achieve zooming, at least one of the first lens unit and third lens unit Gr1, Gr3 be moved along the optical axis AX, and it is further preferable that, as in all of the embodiments, at least both the first lens unit and the third lens unit Gr1, Gr3 be moved along the optical axis (AX). This makes it possible to realize a zoom lens system offering higher performance. An arrangement in which the first lens unit and the third lens unit Gr1, Gr3 are moved in the same direction for zooming is particularly effective, and it is further preferable that, in a zoom arrangement that fulfills conditional formula (1), at least one of the first lens unit and the third lens unit Gr1, Gr3 be moved for zooming.

Many conventional zoom lens systems designed for video cameras keep their first and third lens units Gr1, Gr3 stationary during zooming. This is primarily because moving more lens units makes the design of lens barrels more difficult. However, today's lens barrel design is so sophisticated that satisfactorily waterproof and dustproof arrangements have been developed that permit movement of the front-end lens unit. Accordingly, by moving at least one of the first lens unit and the third lens unit Gr1, Gr3 during zooming, it is possible to enhance compactness, in particular, at the wide-angle end W. Moving the first lens unit Gr1 toward the object side during zooming from the wide-angle end W to the telephoto end T helps lower the heights at which rays enter the second lens unit Gr2, and thus makes aberration correction easier. Moving the second lens unit Gr2 toward the image side and the third lens unit Gr3 toward the object side during zooming from the wide-angle end W to the telephoto end T helps achieve a high zoom ratio.

It is preferable that conditional formulae (2) and (3) below be fulfilled, and it is further preferable that conditional formulae (1), (2), and (3) be fulfilled. Fulfilling conditional formulae (2) and (3) makes it possible to realize a high-performance zoom lens system with satisfactorily corrected aberration.

$$0.5 < |f2/f3| < 1.6 \quad (2)$$

$$0.5 < f3/f4 < 1.4 \quad (3)$$

where f2 represents the focal length of the second lens unit Gr2;

f3 represents the focal length of the third lens unit Gr3; and f4 represents the focal length of the fourth lens unit Gr4.

If the lower limit of conditional formula (2) were to be transgressed, the power of the second lens unit Gr2 would be relatively too strong, and thus it would be difficult to correct the spherical aberration and coma that would occur therein at the telephoto end T. By contrast, if the upper limit of conditional formula (2) were to be transgressed, the power of the second lens unit Gr2 would be relatively too weak, and thus the second lens unit Gr2 would need to be made larger in external diameter. This is undesirable in terms of compactness. If the lower limit of conditional formula (3) were to be transgressed, the power of the third lens unit Gr3 would be relatively too strong, and thus it would be difficult to correct spherical aberration, in particular, at telephoto end T. By contrast, if the upper limit of conditional formula (3) were to be transgressed, the power of the third lens unit Gr3 would be relatively too weak, and thus it would be difficult to correct curvature of field, in particular, in the middle-focal-length region.

It is preferable that, as in all of the embodiments, zooming from the wide-angle end W to the telephoto end T be achieved by moving the second lens unit, the third lens unit, and the fourth lens unit Gr2, Gr3, Gr4 in such a way as to decrease the distance between the second lens unit and the third lens unit Gr2, Gr3 and increase the distance between the third lens unit and the fourth lens unit Gr3, Gr4 and that focusing be achieved by moving (as indicated by the arrow mF) the fourth lens unit Gr4 along the optical axis AX. This makes it possible to realize a zoom lens system that offers satisfactory performance. In a high-zoom-ratio zoom lens system, it is essential to distribute the overall zoom ratio efficiently among individual lens units. To make the zoom ratio shares of the individual lens units as high as possible, it is preferable to achieve zooming from the wide-angle end W to the telephoto end T by moving the second lens unit Gr2, the third lens unit GR3, and the fourth lens unit Gr4, which together are responsible for most of the overall zoom ratio, in such a way as to increase the unit-to-unit aerial distances between them. Moreover, it is preferable to achieve focusing by moving as light a lens unit as possible, and therefore the fourth lens unit Gr4, with a comparatively small number of lens elements, and with a comparatively small lens diameter, is most suitable as the focusing unit. For these reasons, and also in terms of aberration correction, it is preferable that focusing be achieved by moving the fourth lens unit Gr4 and that zooming be achieved by varying the distances between the individual lens units Gr2 to Gr4.

It is preferable to dispose, as in all of the embodiments, an aspherical surface in the second lens unit Gr2. Disposing an aspherical surface in the second lens unit Gr2 makes it possible to realize a zoom lens system of which the zoom range starts at a wider angle. An attempt to increase the shooting view angle by reducing the focal length at the wide-angle end W ends in making correction of distortion difficult, in particular, at the wide-angle end W. To avoid this inconvenience, it is preferable to dispose an aspherical surface in the second lens unit Gr2 through which off-axial rays pass at relatively great heights on the wide-angle side. This makes proper correction of distortion possible.

It is preferable to use, as in all of the embodiments, at least five lens elements, i.e. at least three positive lens elements and at least two negative lens elements, in the third lens unit Gr3. By building the third lens unit Gr3 in this way, it is possible to properly correct the aberration that occurs at high zoom ratios. In a zoom lens system of a positive-negative-positive-positive configuration, the negative power of the second lens unit Gr2 increases the heights of rays, and thus inevitably makes correction of aberration difficult. In particular, when high performance is aimed for at high zoom ratios, proper correction of aberration cannot be achieved without increasing the number of lens elements constituting the third lens unit Gr3. By building the third lens unit Gr3 out of at least three positive lens elements and two negative lens elements, it is possible to strike a proper balance between a high zoom ratio and high performance, on one hand, and compactness and low costs, on the other hand.

In all of the first to the third embodiments, all the lens units are comprised solely of refractive lenses that deflect light incident thereon by refraction (i.e., lenses of the type that deflects light at the interface between two media having different refractive indices). However, any of these lens units may include, for example, a diffractive lens that deflects light incident thereon by diffraction, a refractive-diffractive hybrid lens that deflects light incident thereon by the combined effects of refraction and diffraction, a gradient-index lens that deflects light incident thereon with varying refractive indices distributed in a medium, or a lens of any other type.

In any of the embodiments, a surface having no optical power (for example, a reflective, refractive, or diffractive surface) may be disposed in the optical path so that the optical path is bent before, after, or in the middle of the zoom lens system. Where to bend the optical path may be determined to suit particular needs. By bending the optical path appropriately, it is possible to make a camera slimmer. It is possible even to build an arrangement in which zooming or the collapsing movement of a lens barrel does not cause any change in the thickness of a camera. For example, by keeping the first lens unit Gr1 stationary during zooming, and disposing a mirror behind the first lens unit Gr1 so that the optical path is bent by 90° by the reflecting surface of the mirror, it is possible to keep the front-to-rear length of the zoom lens system constant and thereby make the camera slimmer.

In all of the embodiments, an optical low-pass filter having the shape of a plane-parallel plate PL is disposed between the last surface of the zoom lens system and the image sensor SR. However, as this low-pass filter, it is also possible to use a birefringence-type low-pass filter made of quartz or the like having its crystal axis aligned with a predetermined direction, a phase-type low-pass filter that achieves the required optical cut-off frequency characteristics by exploiting diffraction, or a low-pass filter of any other type.

PRACTICAL EXAMPLES

Hereinafter, practical examples of the construction of the zoom lens system used in taking lens devices embodying the present invention will be presented in more detail with reference to their construction data, aberration diagrams, and other data. Examples 1 to 3 presented below respectively correspond to the first to the third embodiments described hereinbefore, and the lens arrangement diagrams (FIGS. 1 to 3) showing the lens arrangement of the first to the third embodiments apply also to Examples 1 to 3, respectively.

Tables 1 to 3 list the construction data of Examples 1 to 3, respectively. In the construction data of each example, ri (i=1, 2, 3, ...) represents the radius of curvature (mm) of the i-th surface from the object side. Di (i=1, 2, 3, ...) represents the i-th axial distance (mm) from the object side, and Ni (i=1, 2, 3, ...) and vi (i=1, 2, 3, ...) represent the refractive index Nd for the d-line and the Abbe number vd of the i-th optical element from the object side, respectively. Moreover, in the construction data, for each of those axial distances that vary with zooming (i.e., variable aerial distances), three values are given that are, from left, the axial distance at the wide-angle end W (the shortest-focal-length end), the axial distance in the middle position M (the middle-focal-length position), and the axial distance at the telephoto end T (the longest-focal-length end). Also listed are the focal length f (in mm) and the f-number FNO of the entire optical system in those three focal-length positions W, M, and T. Table 4 lists the movement distance (focusing data) of the fourth lens unit Gr4 when focusing at a close-up distance (shooting distance: D=0.5 m), and Table 5 lists the values of the conditional formulae, both as actually observed in Examples 1 to 3.

A surface whose radius of curvature ri is marked with an asterisk (*) is an aspherical surface, of which the surface shape is defined by formula (AS) below. The aspherical surface data of Examples 1 to 3 is also listed in their respective construction data.

$$X(H) = (C0 \cdot H^2)/(1 + \sqrt{1 - \epsilon \cdot C0^2 \cdot H^2}) + (A4 \cdot H^4 + A6 \cdot H^6 + A8 \cdot H^8) \quad (AS)$$

where
- X(H) represents the displacement along the optical axis at the height H (relative to the vertex);
- H represents the height in a direction perpendicular to the optical axis;
- C0 represents the paraxial curvature (the reciprocal of the radius of curvature);
- $\epsilon$ represents the quadric surface parameter; and
- Ai represents the aspherical surface coefficient of i-th order.

FIGS. 4A–4I, 5A–5I, and 6A–6I are diagrams showing the aberration observed in Examples 1 to 3, respectively, when focused at infinity. FIGS. 7A–7F and 8A–8F are diagrams showing the aberration observed in Examples 2 and 3, respectively, when focused at a close-up distance (shooting distance: D=0.5 m). Of these diagrams, FIGS. 4A–4C, 5A–5C, 6A–6C, 7A–7C, and 8A–8C show the aberration observed at the wide-angle end W, FIGS. 4D–4F, 5D–5F, and 6D–6F show the aberration observed in the middle position M, and FIGS. 4G–4I, 5G–5I, 6G–6I, 7D–7F, and 8D–8F show the aberration observed at the telephoto end T. Of these diagrams, FIGS. 4A, 4D, 4G, 5A, 5D, 5G, 6A, 6D, 6G, 7A, 7D, 8A, and 8D show spherical aberration, FIGS. 4B, 4E, 4H 5B, 5E, 5H, 6B, 6E, 6H, 7B, 7E, 8B, and 8E show astigmatism, and FIGS. 4C, 4F, 4I, 5C, 5F, 5I, 6C, 6F, 6I, 7C, 7F, 8C, and 8F show distortion. In these diagrams, Y' represents the maximum image height (mm). In the diagrams showing spherical aberration, a solid line d and a dash-and-dot line g show the spherical aberration for the d-line and for the g-line, respectively, and a broken line SC shows the sine condition. In the diagrams showing astigmatism, a broken line DM and a solid line DS represent the astigmatism for the d-line on the meridional plane and on the sagittal plane, respectively. In the diagrams showing distortion, a solid line represents the distortion (%) for the d-line.

TABLE 1

Construction Data of Example 1 f = 7.8~34.1~74.5, FNO = 2.17~3.11~3.60

| Radius of Curvature | Axial Distance | Refractive Index | Abbe Number |
|---|---|---|---|
| r1 = 133.331 | | | |
| | d1 = 1.000 | N1 = 1.84894 | v1 = 32.94 |
| r2 = 70.390 | | | |
| | d2 = 5.416 | N2 = 1.49310 | v2 = 83.58 |
| r3 = −597.775 | | | |
| | d3 = 0.100 | | |
| r4 = 63.909 | | | |
| | d4 = 4.632 | N3 = 1.49310 | v3 = 83.58 |
| r5 = 682.906 | | | |
| | d5 = 1.000~38.466~63.228 | | |
| r6* = 30.052 | | | |
| | d6 = 0.800 | N4 = 1.75450 | v4 = 51.57 |
| r7 = 10.921 | | | |
| | d7 = 7.918 | | |
| r8 = −21.486 | | | |
| | d8 = 2.383 | N5 = 1.84844 | v5 = 30.38 |
| r9 = −14.983 | | | |
| | d9 = 0.800 | N6 = 1.66983 | v6 = 54.97 |
| r10 = 23.472 | | | |
| | d10 = 0.100 | | |
| r11 = 21.626 | | | |
| | d11 = 4.584 | N7 = 1.84791 | v7 = 28.10 |
| r12 = −34.973 | | | |
| | d12 = 0.919 | | |
| r13 = −21.013 | | | |
| | d13 = 0.800 | N8 = 1.79850 | v8 = 22.60 |
| r14 = −56.826 | | | |
| | d14 = 33.775~3.110~1.000 | | |
| r15 = ∞(ST) | | | |
| | d15 = 0.800 | | |
| r16 = 9.323 | | | |
| | d16 = 4.442 | N9 = 1.49310 | v9 = 83.58 |
| r17 = 116.438 | | | |
| | d17 = 1.398 | | |
| r18 = 9.532 | | | |
| | d18 = 2.748 | N10 = 1.49310 | v10 = 83.58 |
| r19 = −234.166 | | | |
| | d19 = 0.323 | | |
| r20 = −37.057 | | | |
| | d20 = 0.800 | N11 = 1.68108 | v11 = 31.68 |
| r21 = 11.490 | | | |
| | d21 = 0.100 | | |
| r22 = 10.262 | | | |
| | d22 = 1.301 | N12 = 1.79850 | v12 = 22.60 |
| r23 = 14.389 | | | |
| | d23 = 0.629 | | |
| r24* = 54.649 | | | |

TABLE 1-continued

Construction Data of Example 1 d24 = 0.800 N13 = 1.71944 v13 = 40.11
r25* = 16.014
d25 = 2.361~8.690~18.107
r26 = 21.695
d26 = 1.901 N14 = 1.75450 v14 = 51.57
r27 = −170.024
d27 = 0.813
r28 = −21.114
d28 = 1.909 N15 = 1.75450 v15 = 51.57
r29 = −11.436
d29 = 0.173
r30 = −11.070
d30 = 6.000 N16 = 1.78472 v16 = 24.43
r31* = −21.499
d31 = 1.000~8.826~2.802
r32 = ∞
d32 = 3.000 N17 = 1.51680 v17 = 64.20
r33 = ∞
Aspherical Surface Data of Surface r6
$\epsilon$ = 1.0000, A4 = 0.11027 × 10$^{-4}$, A6 = −0.39875 × 10$^{-8}$,
A8 = −0.53394 × 10$^{-10}$
Aspherical Surface Data of Surface r24
$\epsilon$ = 1.0000, A4 = 0.73520 × 10$^{-3}$, A6 = 0.37052 × 10$^{-5}$,
A8 = −0.27495 × 10$^{-6}$
Aspherical Surface Data of Surface r25
$\epsilon$ = 1.0000, A4 = −0.16554 × 10$^{-3}$, A6 = 0.97331 × 10$^{-5}$,
A8 = −0.16502 × 10$^{-6}$
Aspherical Surface Data of Surface r31
$\epsilon$ = 1.0000, A4 = −0.10302 × 10$^{-4}$, A6 = −0.17042 × 10$^{-6}$,
A8 = 0.16382 × 10$^{-8}$

TABLE 2

Construction Data of Example 2 f = 7.9~34.7~75.7, FNO = 2.26~3.17~3.60

| Radius of Curvature | Axial Distance | Refractive Index | Abbe Number |
|---|---|---|---| r1 = 121.227
d1 = 1.000 N1 = 1.83400 v1 = 37.05
r2 = 59.336
d2 = 6.090 N2 = 1.49310 v2 = 83.58
r3 = −832.771
d3 = 0.100
r4 = 58.402
d4 = 5.200 N3 = 1.49310 v3 = 83.58
r5 = 1279.099
d5 = 1.000~37.008~59.871
r6* = 26.964
d6 = 0.800 N4 = 1.75450 v4 = 51.57
r7 = 10.468
d7 = 7.529
r8 = −20.877
d8 = 2.023 N5 = 1.80741 v5 = 31.59
r9 = −18.539
d9 = 0.800 N6 = 1.62280 v6 = 56.88
r10 = 27.615
d10 = 0.386
r11 = 23.782
d11 = 4.399 N7 = 1.84666 v7 = 23.82
r12 = −29.259
d12 = 0.549
r13 = −21.920
d13 = 0.800 N8 = 1.79850 v8 = 22.60
r14 = −218.797
d14 = 32.006~4.040~1.719
r15 = ∞(ST)
d15 = 0.800
r16 = 9.384
d16 = 4.302 N9 = 1.49310 v9 = 83.58
r17 = 130.301
d17 = 1.487
r18 = 9.294
d18 = 2.785 N10 = 1.49310 v10 = 83.58

TABLE 2-continued

Construction Data of Example 2 r19 = −168.781
d19 = 0.332
r20 = −34.617
d20 = 0.800 N11 = 1.70055 v11 = 30.11
r21 = 10.967
d21 = 0.270
r22 = 9.767
d22 = 1.344 N12 = 1.79850 v12 = 22.60
r23 = 14.300
d23 = 0.616
r24* = 48.723
d24 = 0.800 N13 = 1.74400 v13 = 44.93
r25* = 16.655
d25 = 2.745~8.245~16.745
r26 = 19.722
d26 = 1.874 N14 = 1.75450 v14 = 51.57
|r27 = 6421.370
d27 = 0.911
r28 = −20.672
d28 = 1.610 N15 = 1.75450 v15 = 51.57
r29 = −11.860
d29 = 0.108
r30 = −11.726
d30 = 5.888 N16 = 1.75000 v16 = 25.14
r31* = −22.987
d31 = 1.000~9.073~3.050
r32 = ∞
d32 = 3.000 N17 = 1.51680 v17 = 64.20
r33 = ∞
Aspherical Surface Data of Surface r6
$\epsilon$ = 1.0000, A4 = 0.10106 × 10$^{-4}$, A6 = −0.13816 × 10$^{-8}$,
A8 = −0.93101 × 10$^{-10}$
Aspherical Surface Data of Surface r24
$\epsilon$ = 1.0000, A4 = −0.72755 × 10$^{-3}$, A6 = 0.42154 × 10$^{-5}$,
A8 = −0.27226 × 10$^{-6}$
Aspherical Surface Data of Surface r25
$\epsilon$ = 1.0000, A4 = −0.17440 × 10$^{-3}$, A6 = 0.10051 × 10$^{-4}$,
A8 = −0.18599 × 10$^{-6}$
Aspherical Surface Data of Surface r31
$\epsilon$ = 1.0000 A4 = −0.77314 × 10$^{-5}$, A6 = −0.19224 × 10$^{-6}$,
A8 = 0.23140 × 10$^{-8}$

TABLE 3

Construction Data of Example 3 f = 8.0~35.2~76.8, FNO = 2.26~3.23~3.60

| Radius of Curvature | Axial Distance | Refractive Index | Abbe Number |
|---|---|---|---| r1 = 88.161
d1 = 1.000 N1 = 1.83400 v1 = 37.05
r2 = 45.205
d2 = 7.701 N2 = 1.49310 v2 = 83.58
r3 = −932.575
d3 = 0.100
r4 = 44.823
d4 = 5.511 N3 = 1.49310 v3 = 83.58
r5 = 999.770
d5 = 1.000~26.812~42.672
r6* = 39.542
d6 = 0.800 N4 = 1.75450 v4 = 51.57
r7 = 10.617
d7 = 7.125
r8 = −19.096
d8 = 1.687 N5 = 1.80741 v5 = 31.59
r9 = −16.075
d9 = 0.800 N6 = 1.62280 v6 = 56.88
r10 = 35.348
d10 = 0.100
r11 = 25.880
d11 = 4.174 N7 = 1.84666 v7 = 23.82
r12 = −28.581
d12 = 0.561
r13 = −21.228

TABLE 3-continued

Construction Data of Example 3 d13 = 0.800 N8 = 1.79850 ν8 = 22.60
r14 = −107.562
d14 = 33.096~4.442~1.000
r15 = ∞(ST)
d15 = 0.800
r16 = 9.362
d16 = 3.491 N9 = 1.49310 ν9 = 83.58
r17 = 146.788
d17 = 1.852
r18 = 9.017
d18 = 2.692 N10 = 1.49310 ν10 = 83.58
r19 = 411.223
d19 = 0.318
r20 = −48.225
d20 = 0.800 N11 = 1.70055 ν11 = 30.11
r21 = 12.689
d21 = 0.435
r22 = 11.089
d22 = 1.214 N12 = 1.79850 ν12 = 22.60
r23 = 14.207
d23 = 0.598
r24* = 48.907
d24 = 0.800 N13 = 1.74400 ν13 = 44.93
r25* = 16.219
d25 = 3.447~7.126~17.213
r26 = 19.962
d26 = 1.747 N14 = 1.75450 ν14 = 51.57
r27 = 156.771
d27 = 0.880
r28 = −24.380
d28 = 1.683 N15 = 1.75450 ν15 = 51.57
r29 = −13.735
d29 = 0.116
r30 = −13.467
d30 = 4.997 N16 = 1.75000 ν16 = 25.14
r31* = −26.567
d31 = 1.000~9.200~1.334
r32 = ∞
d32 = 3.000 N17 = 1.51680 ν17 = 64.20
r33 = ∞
Aspherical Surface Data of Surface r6
ε = 1.0000, A4 = 0.79711 × 10$^{-5}$, A6 = −0.26704 × 10$^{-7}$,
A8 = −0.48577 × 10$^{-10}$
Aspherical Surface Data of Surface r24
ε = 1.0000, A4 = −0.73930 × 10$^{-3}$, A6 = 0.47872 × 10$^{-5}$,
A8 = −0.23504 × 10$^{-6}$
Aspherical Surface Data of Surface r25
ε = 1.0000, A4 = −0.17200 × 10$^{-3}$, A6 = 0.11137 × 10$^{-4}$,
A8 = −0.13472 × 10$^{-6}$
Aspherical Surface Data of Surface r31
ε = 1.0000, A4 = −0.13164 × 10$^{-4}$, A6 = −0.34066 × 10$^{-6}$,
A8 = 0.39948 × 10$^{-8}$

TABLE 4

Focusing Data
Focusing Unit: Fourth Lens Unit (Gr4)
Movement Direction: Toward the Object
Shooting Distance (from Object Point
to Image Plane): D = 0.5 (m)

| | Movement Distance of Focusing Unit | | |
|---|---|---|---|
| | W | M | T |
| Example 1 | 0.287 | 2.827 | 10.04 |
| Example 2 | 0.301 | 2.933 | 10.509 |
| Example 3 | 0.334 | 3.304 | 12.970 |

TABLE 5

Actual Values of Conditional Formulae

| | Conditional Formula (1) f1/fW | Conditional Formula (2) \|f2/f3\| | Conditional Formula (3) f3/f4 |
|---|---|---|---|
| Example 1 | 14.16 | 0.83 | 0.69 |
| Example 2 | 13.01 | 0.80 | 0.65 |
| Example 3 | 9.73 | 0.76 | 0.56 |

What is claimed is:

1. An optical device comprising:
   a zoom lens system having an optical system which comprises a plurality of lens units and which achieves zooming by varying unit-to-unit distances; and
   an image sensor for converting an optical image formed by the zoom lens system into an electrical signal,
   wherein the zoom lens system comprises at least, from an object side thereof to an image side thereof, a first lens unit having a positive optical power, a second lens unit having a negative optical power, a third lens unit having a positive optical power, and a fourth lens unit having a positive optical power,
   wherein, during zooming from wide-angle to telephoto, the fourth lens unit is moved toward the object side of said zoom lens system in a zoom range from wide-angle to a middle-focal-length position and toward the image side of said zoom lens system in a zoom range from the middle-focal-length position to telephoto, and
   wherein the following conditional formula is satisfied:

$$9 < f1/fW < 30$$

where
   f1 represents a focal length of the first lens unit; and
   fW represents a focal length of an entirety of said optical system at the wide-angle.

2. An optical device as claimed in claim 1, wherein, during zooming, at least the first lens unit and the third lens unit are moved along an optical axis.

3. An optical device as claimed in claim 2, wherein the following conditional formulae are additionally satisfied:

$$0.5 < |f2/f3| < 1.6$$
   $$0.5 < f3/f4 < 1.4$$

where
   f2 represents a focal length of the second lens unit;
   f3 represents a focal length of the third lens unit; and
   f4 represents a focal length of the fourth lens unit.

4. An optical device as claimed in claim 1,
   wherein the following conditional formulae are additionally satisfied:

$$0.5 < |f2/f3| < 1.6$$
   $$0.5 < f3/f4 < 1.4$$

where
   f2 represents a focal length of the second lens unit;
   f3 represents a focal length of the third lens unit; and
   f4 represents a focal length of the fourth lens unit.

5. An optical device as claimed in claim 4,
   wherein zooming from wide-angle to telephoto is achieved by moving the second lens unit, the third lens unit, and the fourth lens unit in such a way as to decrease a distance between the second lens unit and the third lens unit and increase a distance between the third lens unit and the fourth lens unit, and wherein focusing is achieved by moving the fourth lens unit.

6. An optical device as claimed in claim 1, wherein zooming from wide-angle to telephoto is achieved by moving the second lens unit, the third lens unit, and the fourth lens unit in such a way as to decrease a distance between the second lens unit and the third lens unit and increase a distance between the third lens unit and the fourth lens unit, and wherein focusing is achieved by moving the fourth lens unit.

7. An optical device as claimed in claim 1 wherein the fourth lens unit is smaller then the first lens unit, the second lens unit, and the third lens unit.

8. An optical device as claimed in claim 1 further comprising a low-pass filter, the low-pass filter located between the first lens unit and the image sensor, wherein the low-pass filter adjusts spatial frequency characteristics of the optical image formed by the zoom lens system.

9. An optical device as claimed in claim 8, wherein the low-pass filter is kept stationary during zooming, and wherein the third lens unit includes an aperture stop at its object side.

10. An optical device as claimed in claim 1 wherein the zoom lens system achieves zooming from wide-angle to telephoto by moving the first lens unit and the third lens unit toward the object side of the zoom lens system, and moving the second lens unit toward the an image side of the zoom lens system.

11. An optical device as claimed in claim 1, wherein the second lens unit has an aspherical surface.

12. An optical device as claimed in claim 1, wherein the third lens unit is comprised of at least five lens elements.

13. An optical device as claimed in claim 12 wherein at least three of the lens elements have a positive optical power and at least two of the lens elements have a negative optical power.

14. A digital camera comprising:

an optical lens device, and a memory;

wherein said optical lens device has an optical system which comprises a zoom lens system which comprises a plurality of lens units and which achieves zooming by varying unit-to-unit distances; and an image sensor for converting an optical image formed by the zoom lens system into an electrical signal;

wherein the zoom lens system comprises at least, from an object side thereof to an image side thereof, a first lens unit having a positive optical power, a second lens unit having a negative optical power, a third lens unit having a positive optical power, and a fourth lens unit having a positive optical power;

wherein, during zooming from wide-angle to telephoto, the fourth lens unit is moved toward the object side of the zoom lens system in a zoom range from wide-angle to a middle-focal-length position and toward the image side of the zoom lens system in a zoom range from the middle-focal-length position to telephoto;

wherein the following conditional formula is satisfied:

$$9 < f1/fW < 30$$

where f1 represents a focal length of the first lens unit; and fW represents a focal length of an entirety of said optical system at the wide-angle; and wherein said memory is adapted for storing image data from said image sensor, and said memory is not removable from said digital camera.

15. A digital camera as claimed in claim 14 wherein the following conditional formulae are additionally satisfied:

$$0.5 < |f2/f3| < 1.6$$

$$0.5 < f3/f4 < 1.4$$

where f2 represents a focal length of the second lens unit;

f3 represents a focal length of the third lens unit; and f4 represents a focal length of the fourth lens unit.

* * * * *

UNITED STATES PATENT AND TRADEMARK OFFICE
CERTIFICATE OF CORRECTION

PATENT NO. : 6,462,886 B1
DATED : October 8, 2002
INVENTOR(S) : Hitoshi Hagimori It is certified that error appears in the above-identified patent and that said Letters Patent is hereby corrected as shown below:

Title page,
Item [57], ABSTRACT,
Line 1, after "comprises", insert -- a --.
Line 2, after "units", insert -- , --.
Line 3, after "distances", insert -- , --.

Column 1,
Line 57, after "applications", insert -- , --.

Column 9,
Line 23, (the continuation of TABLE 1), under the heading "Aspherical Surface Data of Surface r24", delete "$\varepsilon = 1.0000$, $A4 = 0.73520 \times 10^{-3}$, $A6=0.37052 \times 10^{-5}$", and insert -- $\varepsilon = 1.0000$, $A4 = -0.73520 \times 10^{-3}$, $A6=0.37052 \times 10^{-5}$ --.

Column 10,
Line 17 (the continuation of TABLE 2), under the heading "Aspherical Surface Data of Surface r27", delete "| r27= 6421.370", and insert -- r27= –6421.370 --.

Signed and Sealed this

Thirtieth Day of March, 2004

JON W. DUDAS
*Acting Director of the United States Patent and Trademark Office*